United States Patent [19]
Lavely, Jr.

[11] Patent Number: 6,146,607
[45] Date of Patent: *Nov. 14, 2000

[54] PROCESS FOR PRODUCING HIGHLY REACTIVE LIME IN A FURNACE

[76] Inventor: Lloyd L. Lavely, Jr., 9735 Cherokee La., Leawood, Kans. 66206

[ * ] Notice: This patent issued on a continued prosecution application filed under 37 CFR 1.53(d), and is subject to the twenty year patent term provisions of 35 U.S.C. 154(a)(2).

[21] Appl. No.: 08/899,576

[22] Filed: Jul. 24, 1997

[51] Int. Cl.$^7$ .............................. C01F 11/02; B01D 53/50
[52] U.S. Cl. .................. 423/244.07; 423/244.08; 423/635; 423/636; 423/637
[58] Field of Search ................... 423/637, 636, 423/635, 244.07, 244.08; 110/341

[56] References Cited

U.S. PATENT DOCUMENTS

| | | | |
|---|---|---|---|
| 3,932,587 | 1/1976 | Grantham et al. | 423/242 |
| 4,226,839 | 10/1980 | O'Neill et al. | 423/177 |
| 4,277,450 | 7/1981 | Dilworth | 423/244 |
| 4,424,197 | 1/1984 | Powell et al. | 423/244 |
| 4,490,341 | 12/1984 | Cares | 423/242 |
| 4,552,683 | 11/1985 | Powell et al. | 252/189 |
| 4,588,569 | 5/1986 | Cyran et al. | 423/244 |
| 4,603,037 | 7/1986 | Yoon | 423/244 |
| 4,609,536 | 9/1986 | Yoon et al. | 423/244 |
| 4,788,047 | 11/1988 | Hämälä et al. | 423/244 |
| 5,002,743 | 3/1991 | Kokkonen et al. | 423/244 |
| 5,027,723 | 7/1991 | Landreth et al. | 110/343 |
| 5,034,205 | 7/1991 | Laine | 423/244 |
| 5,176,088 | 1/1993 | Amrhein et al. | 110/345 |
| 5,238,666 | 8/1993 | Janka | 423/244.07 |
| 5,246,364 | 9/1993 | Landreth et al. | 431/3 |
| 5,246,680 | 9/1993 | Pikkujämsä | 423/244.07 |

FOREIGN PATENT DOCUMENTS

| | | | |
|---|---|---|---|
| 2 583 305 A1 | 12/1986 | France | 423/244.07 |

OTHER PUBLICATIONS

"L & C Steinmuller GmbH/Direct Desulfurization Process (DDP) and Polishing Reactor", EPRI Licensed Material, Electric Power Research Institute publication, exact publication date unknown, but at least one year prior to the filing of the present application. pp. L1 and L2.

(List continued on next page.)

*Primary Examiner*—Steven P. Griffin
*Assistant Examiner*—Timothy C Vanoy
*Attorney, Agent, or Firm*—Shughart Thomson & Kilroy P.C.

[57] ABSTRACT

A limestone furnace calcination process involves injecting finely divided limestone particles into a zone in a furnace at which the temperature of the flue gas stream, as it passes through the zone, is above the minimum calcination temperature and below the minimum effective quicklime utilization/sulfation temperature. In conventional furnaces, the minimum calcination temperature, or the calcium carbonate decomposition temperature, ranges from about 1,365 to 1,430° F. The minimum effective quicklime utilization/sulfation temperature refers to the temperature below which the rate of quicklime sulfation of the lime produced by calcination of the limestone is sufficiently slow to result in negligible calcium sulfate formation on the resultant lime, and in conventional furnace applications ranges from 1,600 to 1,800° F. The zone is preferably sized such that limestone particles injected therein will remain at a temperature above the minimum calcination temperature, as the particles are carried downstream, for a period sufficient for substantially complete calcination of the limestone particles to lime while minimizing reactions between the resultant lime particles and sulfur dioxide to form calcium sulfate while the particles are in the furnace and to minimize sintering of the lime and complex calcium compound formation. The resultant lime particles may then be utilized in conventional downstream flue gas desulfurization processes including wet and semi-dry processes.

15 Claims, 5 Drawing Sheets

OTHER PUBLICATIONS

Report No. TR–101071 Jul. 1992 EPRI, 3412 Hillview Ave., Palo Alto CA 94304–1395. "Tampella Power Inc./LIFAC", EPRI Licensed Material, Electric Power Research Institute publication, exact publication date unknown, but at least one year prior to the filing of the present application. pp. K1 and K2.

Furnace Dry Sorbent Injection for $SO_2$ Control: Pilot and Bench Scale Studies, Electric Power Research Institute, Inc., TR–101684, Research Report 2533–09, Final Report Nov. 1992, Title pages, Table of Contents, pp. 2–8, 2–14, 3–1, 3–4, 3–5, 4–1 thru 4–3, 4–6 thru 4–8, 4–11 thru 4–13, 4–16, 4–19 thru 4–24, 5–1, 5–1 thru 5–6, 5–14, 5–24 thru 5–28, 5–30, 5–33 thru 5–36, 5–38, 5–40, 5–42, 5–46, 5–47 and 6–1 thru 6–3.

Dry Sorbent Injection $SO_2$ Control Technology Review, Electric Power Research Institute, Inc., TR–102866, Research Report 982–47, Final Report Nov. 1993, Title pages, Table of Contents, pp. 2–3 thru 2–39, 2–45, 2–47, 2–48, A–1, A–2, A–5, A–9, A–10, C–4, C–6, C–11, C–12, D–8, I–7, I–11, I–12, I–13, I–14, J–13, K–1, K–2, K–3, L–2, L–5, L–7, L–9, M–3, M–4 and N–6.

Proceedings: 1986 Joint Symposium on Dry $SO_2$ and Simultaneous $SO_2/NO_x$ Control Technologies, Electric Power Research Institute, Inc., CS–4966, Project 2533–12, Proceedings Dec. 1986, vol. 1, Title pages, Table of Contents and 2, pp. 3–2, 5–1, 5–4, 5–5, 5–8, 5–9, 5–12, 5–15, 7–2, 7–13, 8–5, 10–2, 10–5, 10–12, 11–1, 11–3, 11–5, 11–7, 11–14, 11–17, 11–22, 12–2, 13–13, 15–1, 15–2, 15–3, 15–6, 15–11, 15–17, 16–1, 16–2, 16–3, 16–5, 16–6, 16–7, 16–8, 16–15, 16–16, 16–17, 17–3, 17–4, 17–7, 17–12, 17–14, 17–16, 17–17, 17–19, 17–20, 18–1, 19–2, 19–4, 19–11, 19–14, 19–15, 19–16, 19–17, 19–20, 19–21, 19–26, 19–27, 20–1, 20–4, 20–5, 20–7, 20–17, 20–18, 22–4, 22–5, 22–18, 23–3, 23–5, 23–12, 24–2, 24–9, 24–11, 24–19, and vol. 2, Title pages, Table of Contents, pp. 26–1, 26–5, 26–7, 26–10, 26–11, 26–13, 26–15, 26–17, 26–21, 29–1, 29–3, 29–5, 29–7, 29–12, 29–13, 29–14, 30–17, 30–20, 31–1, 31–2, 31–4, 31–5, 31–11,31–13, 33–1, 33–3, 33–4, 33–5, 33–6, 33–12,33–14, 33–15, 33–16, 33–17.

Vol. 2, Title pages, Table of Contents, pp. 34–3, 35–11, 35–19, 35–20, 50–2, 50–5, 50–8, 50–10, 50–11, 50–14, 50–16, 50–15, 50–17, 52–1, 52–5, 52–6, 52–7, 52–8, 52–10, 52–11, 52–12 and 52–14.

Boynton, Robert S., *Chemistry and Technology of Lime and Limestone*, Interscience Publishers a division of John Wiley & Sons, Inc., New York, 1966, Title pages, pp. 8–9, 15–16, 60–61, 132, 133, 135, 137–143, 146, 148, 150, 152–155, 157, 158, 183, 191, 192 and 340. No Month.

"LIDS™—Limestone Injection with Dry Scrubbing" promotional literature of The Babcock & Wilcox COmpany, 1988. No Month.

"Flue Gas Desulfurization" promotional literature of Tampella Power Corporation, Williamsport, PA, 1993. No Month.

"Flue Gas Cleaning" promotional literature of Tampella Power Corporation, Williamsport, PA, date of publication unknown but believed to be more than one year prior to filing of above noted application, front and back cover pages, pp. 14–16.

"The Low Emission Boiler System: Clean, Efficient, Reliable Power From Coal," Workshop Agenda, report on the LEBS Low Emission Boiler Systems, Atlanta Georgia, Feb. 22, 1995, pp. 2, 6, 7, and 8.

"Expanding the Dry Scrubbing Capabilities LIMB + SDA," Niro report, Jul./Aug. 1989. Lecture 4, pp. 1–3 & Appendix 1 to Appendix 5.

Kenakkala, T, Suokas, M. and Hautanen, J., *The Tampella Lifac $SO_2$ Process*; pp. 45–1 through 45–13, exact publication date unknown but upon information and belief, published in the United States in 1987.

Kenakkala, T. and Valimaki, E, Status of The Lifac $SO_2$ and $NO_x$ Removal Process, 1988, upon information and belief published in the United States.

Newton, G.H., Moyeda, Prediction of the Performance of Furnace Sorbent Injection on a Coal–Fired Utility Boiler; Nov., 1993, upon information and belief published in the United States.

Koskinen, J. Summary of Three Reports: Lifac Demonstration at Poplar River Power Station; Status Report of U.S. Doe's Lifac Clean Coal III Project; Lifac By–Product; Presented at Globe–92 Product and Technology Demonstration Seminars, Vancouver, B.C., Canada, Mar. 18, 1992.

Ball, M.E., Smith, D.W., Koskinen, J.J., and Enwald, T.A., Lifac–Economical Solution to $SO_2$ Control; Presented at Canadian Institute of Mining Annual General Meeting, Montreal, Apr. 28, 1992.

DePero, M.J., Goots, T.R., and Nolan, P.S., Final Results of the Doe Limb and coolside Demonstration Prjects, Presented at The U.S. Department of Energy First Annual Clean coal Technology Conference, Cleveland, Ohio, Sep. 22–24, 1992.

Ball, M.E., and Enwald, T.A., Installation and Initial Operation of Lifac at Shand Power Station; Presented at American Power Conference, Aug., 1993.

Bjerle, I., Ye, Z. and Wang, W., Limits and Potentials of the Dry Injection Process, 1993 $SO_2$ Control Symposium, vol. 1, Aug. 24–27, 1993.

PROCESS FOR PRODUCING HIGHLY REACTIVE LIME IN A FURNACE

BACKGROUND OF THE INVENTION

The present invention relates to a process for injecting limestone into a furnace to produce a highly reactive lime which is available for downstream flue gas desulfurization processes.

Increased concerns as to the adverse environmental impact of sulfur dioxide emissions and stricter regulations have increased the need for efficient processes for removing sulfur dioxide from the flue gas streams of furnaces utilizing sulfur-containing fuel such as coal or oil. It is well known to utilize lime or hydrated lime to remove sulfur dioxide from furnace flue gas streams.

U.S. Pat. No. 4,609,536 to Yoon et al. discloses a process wherein the lime, utilized as a sorbent, is produced by calcining limestone in a separate reactor. The resultant lime is injected into the flue gas stream downstream of the furnace where it reacts with sulfur dioxide to form solid calcium sulfate and calcium sulfite which is separated from the flue gas stream. The separated solid is innocuous and may be utilized as a construction material or buried in a landfill without adverse environmental effects. As noted in the background of U.S. Pat. No. 5,002,743 to Kokkonen et al., it is also known to inject lime directly into a fluidized bed furnace to reduce the sulfur dioxide content of the flue gas in the furnace.

The Kokkonen '743 patent, U.S. Pat. No. 5,246,364 to Landreth et al. and U.S. Pat. No. 4,788,047 to Hämälä et al. disclose two-step processes in which finely ground limestone, calcium carbonate, is injected into a furnace under conditions which result in the calcination of the limestone to lime and the reaction of the resultant lime with sulfur dioxide in the flue gas stream. Due to several factors including the relatively short retention time of the lime in the furnace and inefficient lime utilization in these processes, only a portion of the lime reacts with the sulfur dioxide therein.

Additional sulfur dioxide removal from the flue gas stream may occur in various downstream wet, semi-dry or dry flue gas desulfurization processes. For example, in some processes, the unreacted lime is hydrated in a slurry in a downstream reactor under conditions which favor reactions between the hydrated lime and sulfur dioxide to form calcium sulfite. Hydrated lime is generally more efficient at sulfur dioxide removal than lime which is not hydrated. Alternatively, in semi-dry processes the solid hydrated lime particles are wetted to form a liquid film on the surface of the particle comprising calcium hydroxide in solution which then reacts with dissolved gaseous sulfur dioxide to form calcium sulfite.

Figure 2:
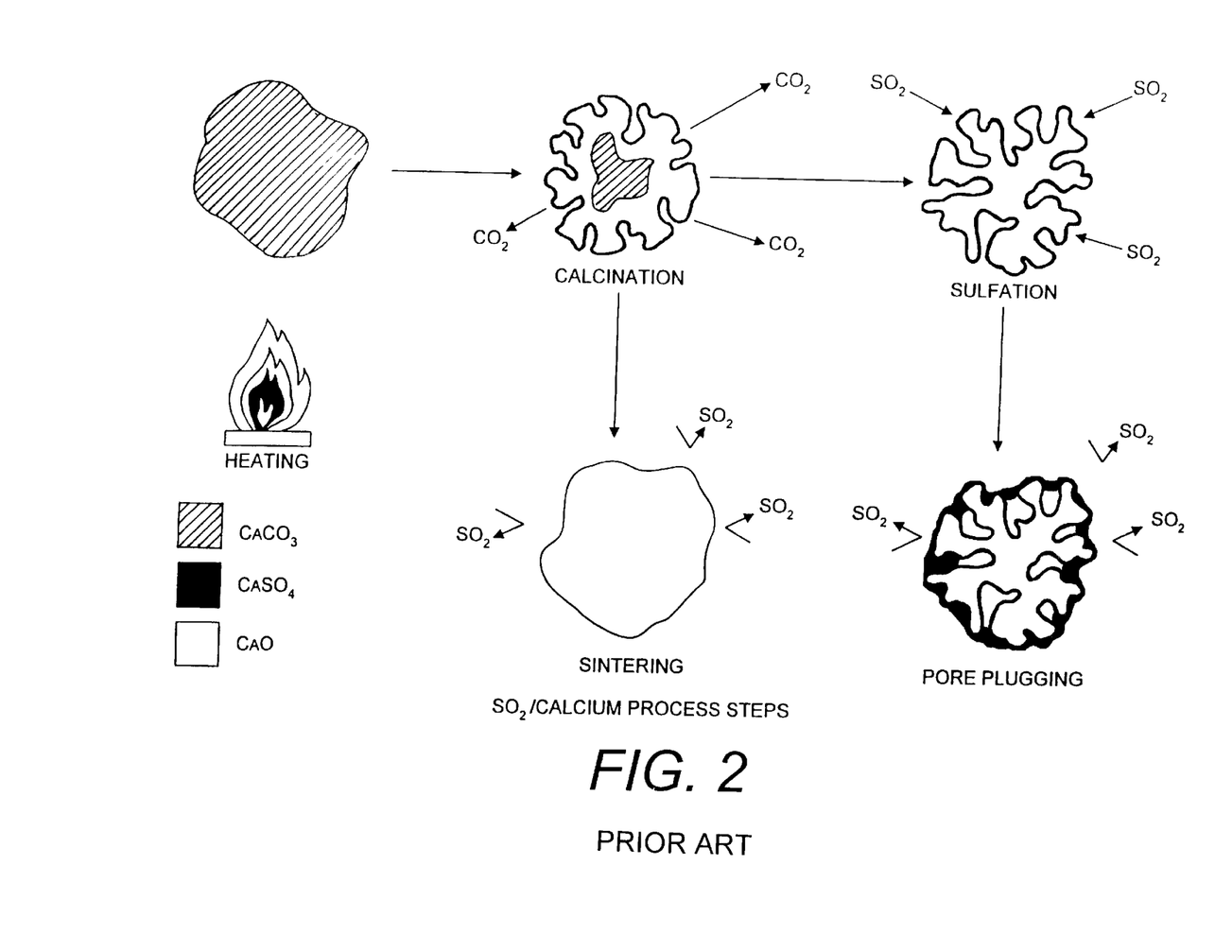
FIG. 2 is a visual representation of the physical and chemical reactions affecting limestone particles injected into a furnace under conditions which favor calcination of the limestone and reactions between the resultant lime and sulfur dioxide in the flue gas.

Although the basic chemistry of the two-step furnace limestone injection calcination and sulfur removal process appears relatively simple, the overall process chemistry and physics are quite complex. FIG. 2 (derived from "Furnace Dry Sorbent Injection for $SO_2$ Control Pilot and Bench Scale Studies" prepared for EPRI, Rept. No. 2533–09, November 1992 by Southern Research Institute, Fossil Energy Research Corp. et al.) provides a visual reference for some aspects of the process chemistry and physics.

At elevated temperatures, limestone (calcium carbonate) decomposes to form lime (calcium oxide) and carbon dioxide as represented by the following formula:

The minimum temperature at which limestone decomposition or calcination occurs in a furnace is dependent upon several factors including the pressure in the furnace and the concentrations of carbon dioxide and water vapor in the combustion gasses. As used herein, the minimum calcination temperature or the calcium carbonate decomposition temperature, generally refers to the temperature at which the rate of limestone calcination is in equilibrium with the rate of recarbonation of the lime to limestone. In conventional furnace applications, the minimum calcination temperature typically ranges between about 1365° Fahrenheit (F.) and 1430° F., but can extend as low as 1200° F., if the furnace operates under negative pressure and the concentration of carbon dioxide in the flue gas is low.

The rate of calcination in the furnace is dependent upon temperature, pressure, carbon dioxide and water vapor concentrations in the furnace gas and the size and quality of the limestone particles injected into the furnace. Smaller particles are heated to their core quicker which increases the overall rate of calcination of the particles. Further, carbon dioxide more readily escapes from smaller particles thereby reducing internal carbon dioxide vapor pressures which would otherwise reduce the rate of reaction.

In the second step of the process, which occurs almost simultaneously with calcination, the resultant lime reacts with sulfur dioxide and oxygen in the flue gas stream to form calcium sulfate as represented by the following formula:

This reaction may be referred to as quicklime sulfation. The rate at which sulfur dioxide reacts with lime in the furnace is a function of the temperature and pressure in the furnace and the concentration of sulfur dioxide in the flue gas. As used herein, the effective quicklime utilization/sulfation temperature window or envelope refers to the temperature range at which quicklime sulfation occurs at a rate sufficient to result in an appreciable amount of quicklime sulfation in the furnace. The lower end temperature of the effective quicklime utilization/sulfation temperature window, which may also be referred to as the minimum effective quicklime utilization/sulfation temperature, refers to the temperature below which the rate of quicklime sulfation is sufficiently slow to result in a negligible amount of calcium sulfate formation on the particles in the furnace taking into consideration the retention time of the flue gas in the furnace. The relatively short retention time of the flue gas in a pulverized coal type boiler or similar boiler and the relatively high quench rate drives up the minimum effective quicklime utilization/sulfation temperature which typically ranges between about 1600° to 1800° F. The amount of resultant lime conversion typically significantly decreases below about 1800° F. The upper end temperature of the effective quicklime utilization/sulfation temperature window corresponds with the decomposition temperature of calcium sulfate which in a pulverized coal type boiler or similar boiler ranges from about 2,200° to 2300° F.

In existing processes of injecting limestone into a furnace for calcination and quicklime sulfation, the limestone is injected into the furnace at temperatures within the effective quicklime utilization/sulfation temperature window and generally at the higher temperatures thereof all of which exceed the minimum calcination temperature.

Injection of limestone into the furnace for calcination and quicklime sulfation therein provides a relatively inexpensive source of lime for desulfurization, as compared to purchasing and injecting commercially available lime or constructing a separate calcination reactor for providing lime on site.

However, the conditions under which the limestone particles are calcined in known furnace limestone injection and calcination processes results in lime particles with reduced reactivity due to sintering, core plugging and complex calcium compound formation from impurities, all of which result in inefficient lime utilization and therefore increased reagent costs and increased downstream auxiliary power requirements.

The efficiency of lime utilization is generally dependent upon the molar percentage of the resultant lime (or calcium ions) which is exposed to sulfur dioxide (i.e. moles of exposed lime divided by the moles of lime). By decreasing the size of the injected limestone particles, and therefore the size of the resultant lime particles, the total surface area, and therefore, the percentage of exposed lime is increased. As carbon dioxide is released from the limestone particles during calcination, pores are formed in the particles which exponentially increase the surface area of each particle and the percentage of exposed lime in the particle. Particle fragmentation during calcination also increases the surface area of the resultant lime.

Sintering, pore plugging and the formation of complex calcium compounds from impurities all significantly reduce the surface area of the lime particles and the percentage of exposed lime in the particle. Sintering involves the loss of surface area and porosity due to physical changes in the particle structure at temperatures below the melting point. Carbon dioxide sintering begins almost instantaneously with calcination. Thermal sintering generally begins at temperatures toward the lower end of the effective quicklime utilization/sulfation temperature window and the rate of sintering increases as the temperature increases.

Pore plugging occurs when calcium sulfate molecules formed on the surface of the lime particle block or occlude the pores thereby significantly reducing the surface area and percentage of lime available for quicklime sulfation. Similarly reactions between lime molecules and impurities in the limestone particle, such as silica, result in the formation of various complex calcium compounds, such as monocalcium and dicalcium silicates, calcium aluminates and dicalcium ferrite. The calcium tied up in these compounds is unavailable for sulfur removal and the formation of these compounds can cause or contribute to pore plugging. The rate of such reactions is generally negligible at temperatures below which quicklime sulfation occurs, but increase as the temperature increases.

In addition to reactions which degrade the quality of the resultant lime at temperatures above the minimum calcination temperature and in particular at temperatures within the effective quicklime utilization/sulfation temperature window, additional reactions which degrade the reactivity of the resulting lime occur at temperatures below the calcination temperature. The extraction of heat from the flue gas cools the flue gas stream rapidly to an exit temperature of approximately 280° to 350° F. As the temperature of the flue gas stream drops below the minimum calcination temperature (1365–1430° F.) the lime will begin to react with carbon dioxide in the flue gas stream to form calcium carbonate (recarbonation), thereby reducing the available lime.

At and below about 900° F., lime will react with water vapor in the flue gas to form solid calcium hydroxide, $Ca(OH)_2$. The solid calcium hydroxide then reacts with gaseous sulfur dioxide to form calcium sulfite as represented by the following equation:

$$Ca(OH)_2 + SO_2 \rightarrow CaSO_3 + H_2O.$$

This reaction may be referred to herein as hydrated lime sulfation. Reactions between solid calcium hydroxide and gaseous sulfur dioxide will occur in the furnace at temperatures as low as about 750° F. Below 750° F. the rate of hydrated lime sulfation between solid calcium hydroxide and gaseous sulfur dioxide is sufficiently slow to preclude any significant calcium sulfite formation. Any calcium sulfite formed on the lime particles in the flue gas stream, as it is cooled from approximately 900° to 750° F., reduces the reactivity of the lime particle for downstream processes such as through pore plugging. In addition, water sintering of the lime particle will occur at temperatures as low as about 900° F.

Figure 3:
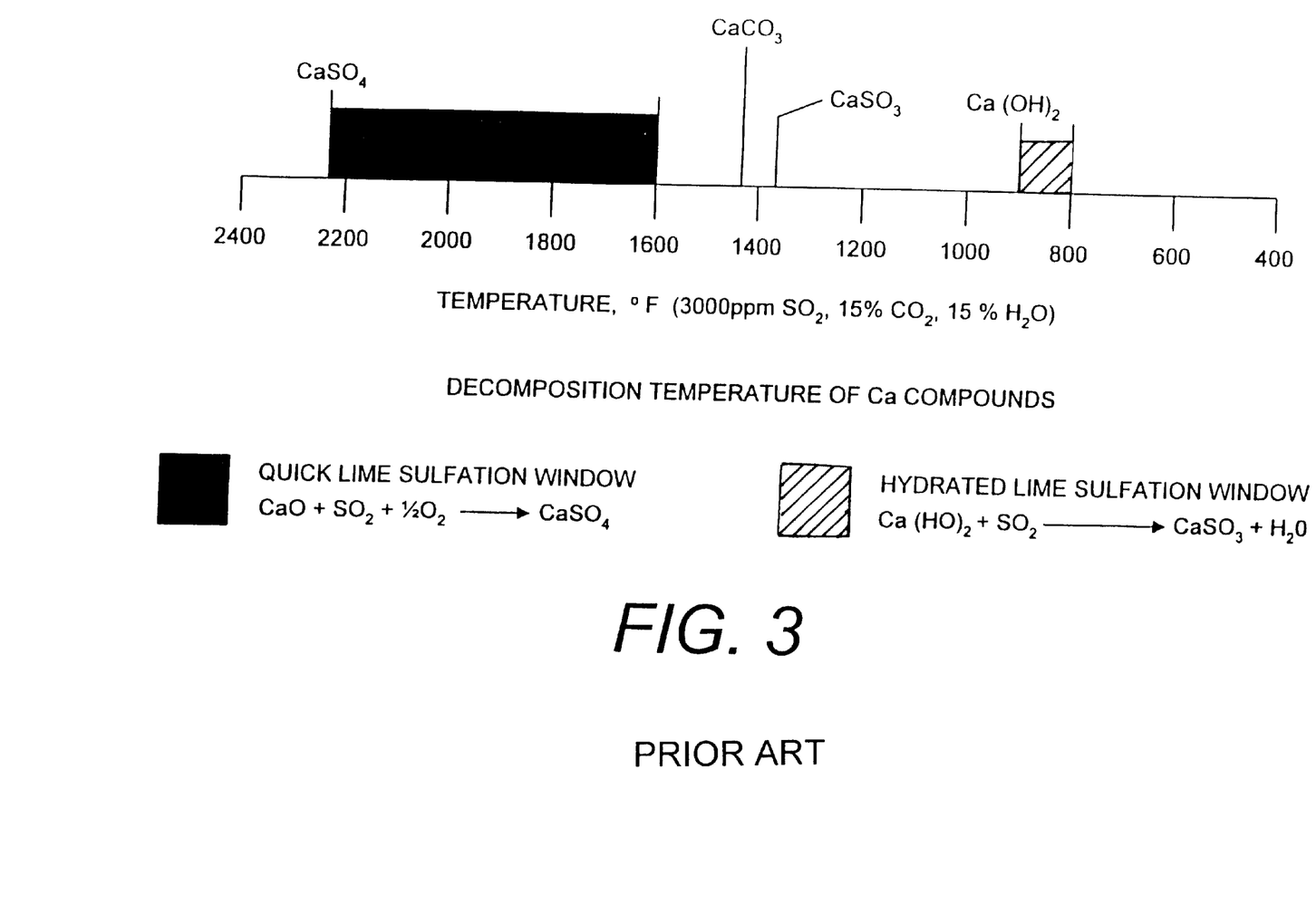
FIG. 3 shows the decomposition temperatures of relevant calcium compounds at specified conditions and shows the temperatures at which quicklime sulfation and hydrated lime sulfation occur in a furnace under the conditions specified.

FIG. 3 (derived from "Dry Hydroxide Injection at Economizer Temperatures for Improved $SO_2$ Control" by Bortz, S. J., Roman, V. P., Yang, P. J., and Offen, G. R., Paper #31 contained in the EPRI "Proceedings: 1986 Joint Symposium on Dry $SO_2$ and Simultaneous $SO_2/NO_x$ Control Technologies," vol. 2) provides a graphical representation of the decomposition temperature of relevant calcium compounds in a furnace with the specified concentrations of sulfur dioxide, carbon dioxide and water vapor. The molar concentration of carbon dioxide and water vapor in the combustion gas of typical furnaces ranges between five percent and fifteen percent for each component. Typical sulfur dioxide concentrations range from 1200 to 2300 parts per million by volume. The relatively low minimum effective quicklime utilization/sulfation temperature shown in FIG. 3, approximately 1600° F., is due to the relatively high sulfur dioxide concentration of 3000 parts per million by volume in the combustion gas.

The efficiency of limestone utilization for sulfur dioxide removal may be expressed by the following relationship:

$$U(\%) = \Delta SO_2(\%)/(Ca/S).$$

$U(\%)$ represents the percent utilization of the calcium content of the injected limestone. $\Delta SO_2$ represents the change in the molar content of sulfur dioxide in the combustion gas. The value of Ca/S represents the molar ratio of the calcium content of the injected limestone to the initial level of sulfur dioxide in the combustion products or flue gas. At a Ca/S ratio of 1.0, the stoichiometric value, the calcium content of injected limestone is theoretically just sufficient to react with all the sulfur dioxide present in the flue gas. However, due to the process inefficiencies as noted above, the calcium utilization is not complete at a Ca/S ratio of 1. The sulfur dioxide removal continues to increase at higher Ca/S ratios and a Ca/S ratio of 2.0 is generally considered to be the economic breakpoint of furnace sorbent injection processes, beyond which the gain in sulfur dioxide removal is not justified by increasing reagent costs. In existing furnace sorbent injection processes, calcium utilization in the furnace generally ranges between approximately ten and thirty-five percent.

The calcium utilization is generally increased in downstream semi-dry and wet desulfurization processes, wherein the partially utilized lime particles are wetted to form calcium hydroxide in a liquid phase (in a liquid layer on the particle in semi-dry processes and in a slurry in wet processes) which reacts with the remaining gaseous sulfur dioxide generally at temperatures of about 30° F. above the water saturation temperature and the water saturation temperature respectively. As noted above, the liquid phase reactions of calcium hydroxide and sulfur dioxide in downstream processes are generally more efficient at sulfur dioxide removal than quicklime sulfation. Unfortunately, the degraded quality of lime provided to such downstream processes by known furnace limestone injection and calcination processes results in inefficient utilization of the calcium content of the lime or limestone feed material.

In summary, in currently utilized processes, limestone is injected into furnaces under conditions which result in calcination of the limestone therein and reactions between the resultant lime and sulfur dioxide in the flue gas to form calcium sulfate in the furnace. Such processes provide a relatively inexpensive source of lime for desulfurization, as compared to purchasing and injecting commercially available lime or constructing a separate calcination reactor for providing lime on site. The goal of such processes is to utilize the heat of the furnace to calcine the limestone to lime while simultaneously achieving sulfur dioxide removal in the furnace. However, the conditions under which the limestone particles are calcined in the furnace in these processes (generally at temperatures within the effective quicklime utilization/sulfation temperature window) result in lime particles with reduced reactivity due to sintering, core plugging and complex calcium compound formation from impurities. These undesirable reactions reduce the percentage of resulting lime available for sulfur dioxide removal thereby decreasing the efficiency of lime utilization and increasing reagent costs and downstream auxiliary power requirements.

There remains a need for processes to provide relatively inexpensive and highly reactive lime which may be efficiently utilized in downstream flue gas desulfurization processes.

SUMMARY OF THE INVENTION

The present invention comprises a limestone injection and calcination process in which limestone particles are injected into a furnace for calcination therein under conditions which result in calcination of a substantial portion of the limestone particles to lime while minimizing undesirable reactions in the furnace involving the lime including sulfation of the resultant lime, sintering of the lime or reactions between the lime and impurities in the injected limestone such as silica. The resultant highly reactive lime entrained in the flue gas stream is then available for downstream flue gas desulfurization processes.

The process involves injecting finely divided limestone particles into a zone in the furnace at which the temperature of the flue gas stream, as it passes through the zone, is above the minimum calcination temperature and below the effective quicklime utilization/sulfation temperature window. The zone is preferably selected such that limestone particles injected therein will remain at a temperature above the minimum calcination temperature, as the particles are carried downstream, for a period sufficient for substantially complete calcination of the limestone particles while minimizing quicklime sulfation reactions. The flue gas stream is then rapidly cooled below the temperatures at which additional reactions which effect the quality of the lime occur to any appreciable degree, including recarbonation, hydration, solid phase hydrated lime sulfation and water sintering. The resultant lime particles may then be utilized in conventional downstream flue gas desulfurization processes including wet and semi-dry processes.

OBJECTS AND ADVANTAGES OF THE INVENTION

Therefore the objects of this invention include providing a process which produces highly reactive lime particles through limestone calcination in a furnace; providing such a process in which the resultant lime particles may be utilized for efficient downstream flue gas desulfurization; providing such a process which attempts to optimize the amount of reactive lime which exits the furnace and is available for downstream flue gas desulfurization; providing such a process which results in substantially complete calcination of the limestone particles injected into the furnace; providing such a process in which the conditions under which calcination occur minimize sintering, quicklime sulfation and reactions between the resultant lime and impurities in the limestone; providing such a process which minimizes reactions which reduce the amount of available reactive lime at temperatures below the minimum calcination temperature including hydrated lime sulfation; providing such a process which reduces reagent costs through more efficient lime utilization; providing such a process which requires relatively minor capital expenditures to implement; providing such a process which may be utilized with various existing downstream flue gas desulfurization processes which utilize lime for sulfur removal.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

Figure 1:
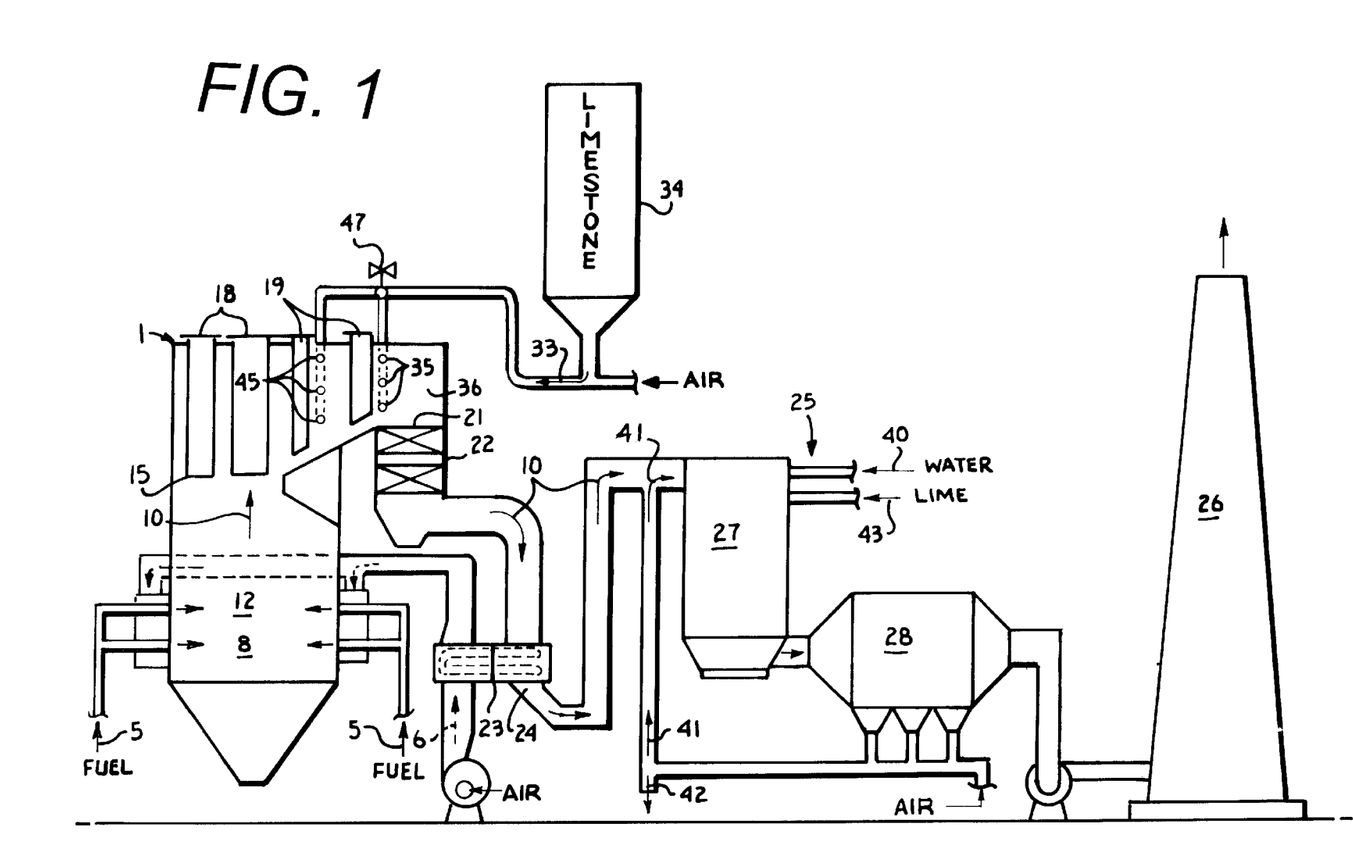
FIG. 1 is a partially schematic flow diagram of a furnace and a downstream semi-dry flue gas desulfurization system with which the process of the present invention may be practiced.

Referring to FIG. 1, the reference numeral 1 generally indicates a furnace or boiler for use in combusting fuel to heat water to generate steam and with which the process of the present invention may be practiced. A sulfur containing fuel 5, such as pulverized coal, and a preheated, oxygen containing gas 6, typically air, are fed into a combustion chamber 8 of the furnace 1 for combustion therein. The gas 6 includes oxygen in excess of that required for combusting the fuel 5. The resultant combustion gas or flue gas 10 includes carbon dioxide, water vapor, oxygen, nitrogen and sulfur dioxide. Typical temperatures just above a flame zone 12 of the combustion chamber 8 of a pulverized coal type furnace or boiler 1 are on the order of 2,500 to 3000° F.

As the hot flue gas 10 travels downstream through the furnace 1, the flue gas flows past various heat exchange surfaces 15 which are adapted to extract heat from the flue gas 10 to produce superheated steam. The heat exchange surfaces 15 typically include portions of the furnace walls and heat exchangers which extend into the furnace chamber such as pendant radiant superheaters 18, pendant convection superheaters 19, horizontal convection superheaters 21, economizers 22 and air preheaters 23. The outlet of the air preheaters 23 is generally considered the end or outlet 24 of the furnace 1. The preheater 23 is used to preheat the air 6 fed into the combustion chamber 8.

The flue gas is cooled to between approximately 710° to 750° F. by the economizer 22. Flue gas 10 passing out of the air preheater 23, typically has been cooled to approximately 250° to 350° F. As used herein, references to the temperature of the flue gas 10 or temperature along the flow path of the flue gas 10 generally refer to the average temperature of the flue gas 10 across a plane extending transverse to the flow path. The residence time of flue gas 10 in a furnace 1 of the type shown is typically approximately four seconds.

After leaving the furnace 1, the flue gas 10 passes through pollution control equipment 25 for removal of particulate and pollutants including sulfur dioxide. The cleansed flue gas 10 is then discharged through a stack 26. The pollution control equipment 25 shown diagrammatically in FIG. 1, comprises a semi-dry flue gas desulfurization system 27 and a particulate collector 28. The flue gas desulfurization system 27 shown in FIG. 1 represents a spray dryer but it is foreseen other systems including a circulating dry scrubber or a gas suspension absorber could also be utilized. The particulate collector 28, shown in FIG. 1, represents an electrostatic precipitator, but it is foreseen that other particulate collectors 28 such as bag houses can be utilized.

It is also foreseen that the pollution control equipment 25 could alternatively utilize a wet process, such as wet lime scrubbing, in which case the particulate collector 28 is positioned upstream of the flue gas desulfurization system 27. The pollution control equipment 25 typically also includes equipment for $NO_x$ removal and may also include equipment for air toxics removal, neither of which are shown.

The process of the present invention involves injecting finely divided limestone particles 33, entrained in a stream of air and pneumatically conveyed from silo 34, through an array or set of nozzles 35 into a calcination cavity 36 in the furnace 1. The limestone 33 is injected into the calcination cavity 36 under conditions which result in the rapid calcination of a significant portion of the limestone 33 to lime while substantially limiting or minimizing quicklime sulfation reactions with the resultant lime, substantially limiting or minimizing sintering of the resultant lime and substantially limiting or minimizing complex calcium compound formation between the resultant lime and impurities therein. The limestone 33 is injected into the calcination cavity 36 generally transverse to the flow path of the flue gas 10 and the limestone particles are entrained in the flue gas 10.

In general, the limestone 33 is injected into the furnace at a location wherein the temperature is below the minimum effective quicklime utilization/sulfation temperature and exceeds the minimum calcination temperature. The limestone 33 is preferably injected into the furnace at a location at which the temperature of the flue gas 10 passing downstream therefrom remains above the minimum calcination temperature for a period sufficient to result in substantially complete calcination of the limestone 33 entrained therein. The calcination cavity or zone 36, as noted above, generally extends from the point of injection of the limestone 33 into the furnace to the downstream point or location in the furnace 1 at which the temperature drops below the minimum calcination temperature.

Depending on the operating conditions of the furnace 1, the minimum calcination temperature in a pulverized coal type boiler or similar boiler 1 will generally range from 1365° F. to 1430° F. but could extend as low as 1200° F. or higher than 1430° F. The minimum effective quicklime utilization/sulfation temperature in a pulverized coal type boiler or similar boiler 1 will typically range from 1600° F. to 1800° F. but could extend higher or lower depending on the operating conditions.

The injected limestone 33 preferably has a top particle size of between three to ten microns in diameter, although it is foreseen that larger top particle sizes such as from ten to one hundred microns could be utilized and would provide a cheaper feed material. In addition, smaller top particle sizes could be utilized but are more costly to produce. For limestone 33 having a top particle size of approximately 10 microns a residence time of approximately 500 milliseconds in the furnace at temperatures above the minimum calcination temperature should be sufficient to achieve substantially complete calcination of the injected limestone 33 to lime with minimal or negligible quicklime sulfation, sintering and complex calcium compound formation. It is foreseen that residence times of between 35 and 600 milliseconds or longer may also be sufficient to provide substantially complete calcination of injected limestone 33 to lime while minimizing or limiting quicklime sulfation, sintering and complex calcium compound formation. The amount of limestone injected will typically range between one and three times the stoichiometric amount of calcium required for complete reaction with the sulfur in the flue gas.

Figure 4:
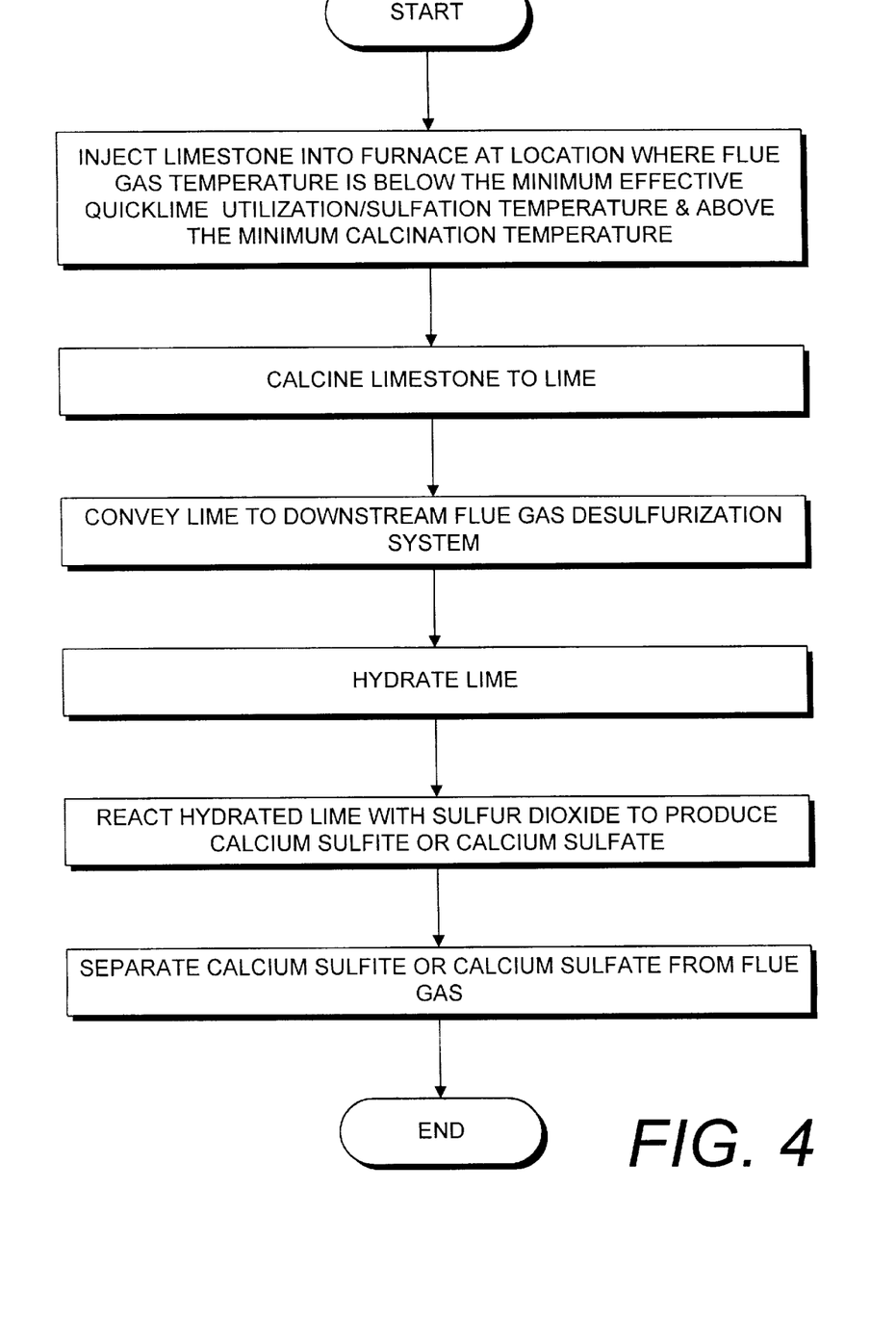
FIG. 4 comprises a process flow diagram of the basic steps of the overall process in which the present invention is intended for use.

The resultant high quality, soft burned lime, which is entrained in the flue gas 10, is conveyed in the flue gas 10 downstream to the pollution control equipment 25. At the pollution control equipment 25, lime, entrained in the flue gas 10, is conveyed into the spray dryer 27. Water 40 is injected or sprayed into the spray dryer 27 so as to wet the surface of the lime particles and form an aqueous layer of hydrated lime on the particles. Alternatively the lime can be hydrated in a solid phase such as in a Circulating Dry Scrubber System. The temperature in the spray dryer is typically maintained at approximately 30° F. above the flue gas water saturation temperature. The hydrated lime reacts with sulfur oxides, including primarily sulfur dioxide with some sulfur trioxide, in the flue gas 10 to form calcium sulfite or calcium sulfate, thereby removing sulfur oxides from the flue gas 10. The flue gas 10 then passes through the particulate collector 28 wherein the particulate comprising calcium sulfite or calcium sulfate and unreacted lime is removed or separated from the flue gas 10. A first portion 41 of the particulate, which includes unreacted lime, is recycled back to the spray dryer 27 and a second portion 42 of the particulate is collected for disposal. Make-up hydrated lime 43 may also be injected into the spray dryer 27, as necessary, to enhance the removal of sulfur dioxide. FIG. 4 comprises a process flow diagram of the basic steps of the overall process in which the present invention is intended for use. It is also foreseen that the resultant quicklime which passes through the spray dryer 27, or similar equipment, without being converted into the hydrate, could be hydrated off-line, or external from the primary process in a slaker or hydrator or the like prior to injection back into the primary process.

The process of the present invention may be implemented into the design of new furnaces or through retrofitting existing furnaces. In designing a calcination cavity 36 into a furnace, an initial step involves determining the quality of available limestone. Relatively porous limestones with minimal impurities are preferred. Once an available limestone has been identified for use in the process, the minimum calcination temperature of that limestone under the typical furnace operating conditions is determined. The primary furnace operating conditions to be taken into consideration in determining the minimum calcination temperature include the pressure in the furnace and the concentration of carbon dioxide and water vapor in the flue gas 10. As noted previously, typical molar concentrations of carbon dioxide and water vapor in the flue gas 10 range from five to fifteen percent each.

Similarly, the minimum effective quicklime utilization/sulfation temperature in the furnace under the typical furnace operating conditions is determined. The primary furnace operating conditions to be taken into consideration in determining the minimum effective quicklime utilization/sulfation temperature include limestone properties, the pressure in the furnace and the concentration of sulfur dioxide in the flue gas 10. As noted above, typical uncontrolled concentrations after combustion of sulfur dioxide in the flue gas 10 range from 200 to 3000 or higher parts per million by volume. Furnaces typically operate at a slight positive or negative pressure at the gas inlet or outlet respectively.

The temperature profile of the flue gas 10 flowing through the furnace 1 is then analyzed (or estimated such as for a new boiler) to generally determine the location in the furnace 1 wherein the temperature of the flue gas 10 equals the minimum effective quicklime utilization/sulfation temperature and the location wherein the temperature of the flue gas equals the minimum calcination temperature. These locations are determined to aid in positioning the calcination cavity 36.

In a preferred embodiment, the calcination cavity 36 is designed into the furnace so as to provide a relatively isothermal zone wherein the temperature of the flue gas 10 passing through the zone is maintained between the minimum calcination temperature and the minimum effective quicklime utilization/sulfation temperature (preferably closer to the effective quicklime utilization/sulfation temperature) for a period sufficient for calcination of substantially all of the limestone injected therein. For example, for limestone particles having a top size diameter of between three and ten microns, such a zone that is sized to provide approximately 300 to 500 milliseconds residence time therein should be sufficient to achieve substantially complete calcination of the limestone.

In the preferred embodiment, such a zone is formed or positioned between successive heat exchangers spaced apart a distance sufficient to provide the desired residence time (i.e. 500 milliseconds) and without heat extraction through wall type heat exchange surfaces within the zone. It is foreseen that in some embodiments some heat extraction through wall type heat exchange surfaces could occur. The temperature of the flue gas 10 is cooled just below the minimum effective quicklime utilization/sulfation temperature as it passes across the heat exchanger 19 on the upstream end of the zone. Taking advantage of the high quench rate of the downstream heat exchangers 21 and 22, upon passing across the heat exchanger on the downstream end of the zone, the flue gas 10 is thereafter rapidly cooled below the minimum calcination temperature and down to a temperature at the outlet 24 of the furnace 1 in the range from approximately 250° to 350° F. Rapid cooling of the flue gas 10 to between 250° and 350° F. minimizes the negative reactions of recarbonation, water sintering and hydrated lime sulfation on the resultant lime particles.

Possible locations for the calcination cavity 36 are generally in the upper region of the furnace 1 and may include between the last pendant convection superheater 19 and the first horizontal convection superheater 21 or between adjacent pendant convection superheaters 19. The nozzles 35 are then positioned just past the upstream heat exchanger 19 such that the limestone particles injected into the calcination cavity 36 do not impinge upon the heat exchanger 19 and cause erosion thereof. The illustrated nozzles 35 are installed through a sidewall of the furnace 1, but it is foreseen that the nozzles 35 may be installed in other configurations such as downward through the top of the furnace 1.

In many applications it will not be possible or practical to provide a substantially isothermal calcination cavity 36. Further, in many cases, and in particular in cases wherein the process of the present invention is to be implemented in an existing furnace 1, it may not be possible or practical to provide a calcination cavity 36 in which the temperature of the flue gas 10 flowing therethrough is maintained between the minimum calcination temperature and the minimum effective quicklime utilization/sulfation temperature for a period sufficient to obtain substantially complete calcination of the limestone injected therein or even calcination of a substantial portion of the limestone. In such circumstances, the percentage of available high quality lime for downstream flue gas desulfurization may be increased by injecting the limestone into the furnace 1 at a location wherein the temperature of the flue gas 10 flowing therethrough exceeds the minimum effective quicklime utilization/sulfation temperature but is quickly cooled below the minimum effective quicklime utilization/sulfation temperature before sintering, sulfation reactions or complex calcium compound formation can occur to a significant degree. Injecting the limestone at a temperature slightly above the minimum effective quicklime utilization/sulfation temperature can provide the additional time necessary to achieve calcination of a substantial portion of the limestone while trying to minimize or limit sintering, sulfation reactions and complex calcium compound formation.

Under ideal conditions, it is conceivable that the percentage of the limestone calcined to lime would approach 100% and the calcium utilization in the furnace would approach 0%. However, it must be recognized that any redesign of the heat exchange configuration of a boiler to provide a calcination cavity 36 will impact on the overall efficiency of the boiler. Therefore, in designing the calcination cavity 36, the potential gain from increased limestone utilization must be balanced against potential changes in the overall process efficiency. Therefore, in most cases, it is unlikely that a calcination cavity 36 providing ideal conditions will be attainable. Calcination will be less than complete and some sulfation will occur. In some cases, calcium utilization rates of 5 percent and possibly as high as 15 percent and calcination of at least half of the limestone injected might be acceptable.

According to the process of the present invention, more than one set of nozzles 35 may be installed in the furnace 1 to permit the injection of limestone at more than one location therein. Providing nozzles 35 at multiple locations, permits the point of limestone injection to be changed to accommodate changes in the furnace operating conditions. For example, off load operating conditions of the furnace 1 might result in a different temperature profile through the furnace 1, changing the location where the temperature of the flue gas 10 approaches the minimum calcination temperature and the minimum effective quicklime utilization/sulfation temperature. In such a situation, a second set of nozzles 45 could be positioned for injection of limestone into the furnace at a location relative to the minimum effective quicklime utilization/sulfation temperature under the changed conditions to maximize calcination while minimizing quicklime sulfation. It is foreseen that even more sets of nozzles could be utilized.

Figure 5:
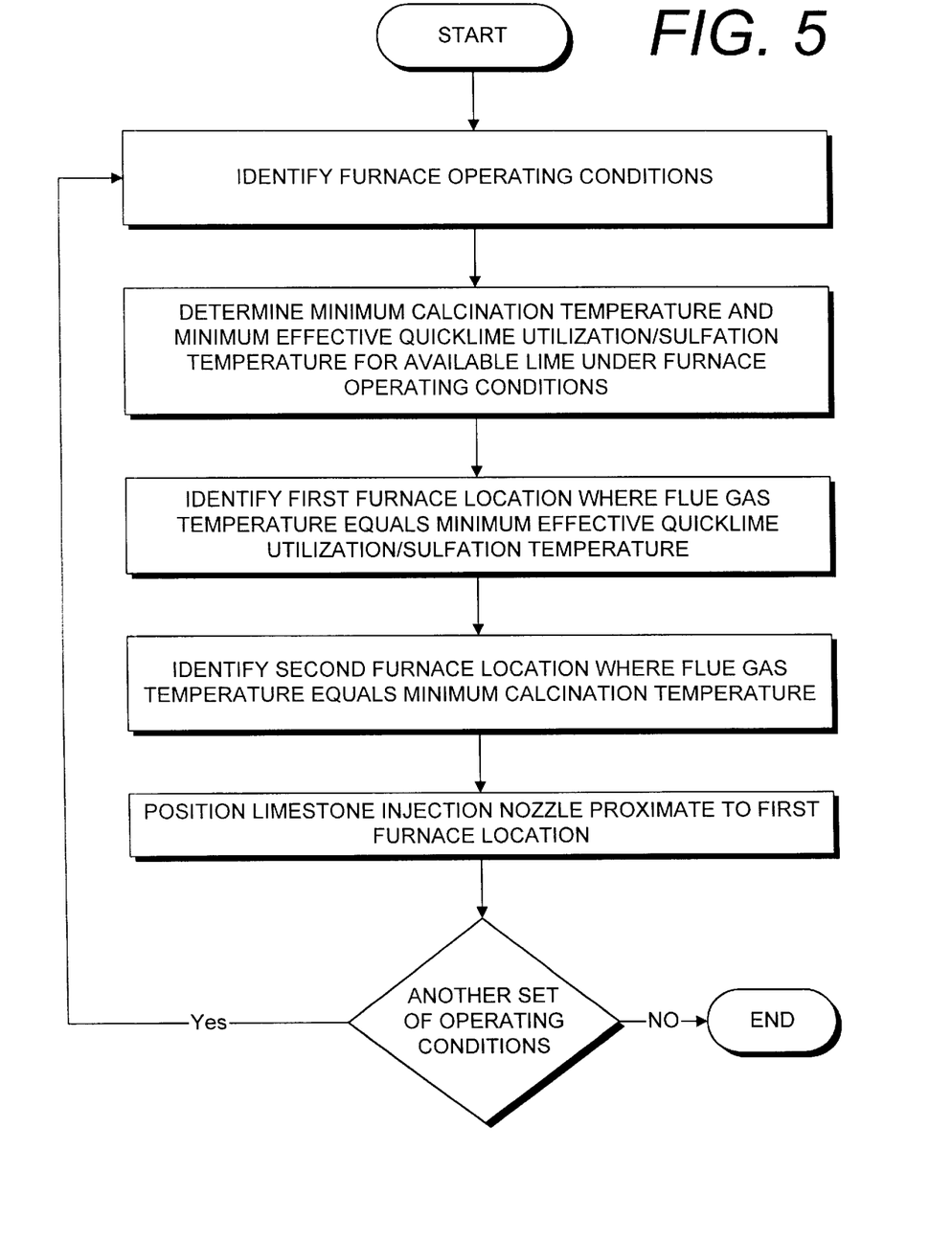
FIG. 5 comprises a process flow diagram of the steps undertaken in implementing the process of the present invention.

It is foreseen that the process could involve intermittently or continuously measuring or monitoring the furnace operating conditions at different nozzle locations, determining the location wherein the conditions most closely approximate the preferred conditions to maximize calcination and minimize quicklime sulfation, and selectively injecting the limestone through the set of nozzles which will introduce the limestone into the portion of the furnace wherein the preferred conditions exist. A valve 47 could be utilized with a controller (not shown) as means for selectively injecting limestone 33 through the first and second set of nozzles 35 and 45 respectively. The controller could be integrated with a feedback control system which monitors furnace operating conditions and automatically adjusts the point of injection depending upon the current operating conditions. Conditions which would be measured or monitored would include temperature, pressure, and the concentration of sulfur dioxide, carbon dioxide and water vapor in the combustion gas 10. FIG. 5 comprises a process flow diagram of the steps undertaken in implementing the process of the present invention.

EXAMPLE

The following example is provided to assist in an understanding of the invention and is based on a furnace with the below noted operating conditions under an anticipated normal operating load.

Pressure in furnace: approximately atmospheric;
Carbon dioxide concentration in flue gas: 5 to 15 mole %;
Uncontrolled sulfur dioxide concentration in flue gas after combustion: 800 to 3000 ppm;
Water vapor concentration in flue gas: 5 to 15 mole %.

The selected limestone is a porous fine grained chalky type limestone. The minimum calcination temperature for this limestone under the specified conditions is approximately 1400° F. The minimum effective quicklime utilization/sulfation temperature under the specified conditions is approximately 1800° F.

The calcination cavity is designed for use with the specified limestone pulverized to a top particle size of approximately 10 microns. The calcination cavity 36 is designed into the furnace to extend from the last pendant convection super heater 19 to the first horizontal convection super heater 21. The flue gas 10 is cooled to approximately 1700° F. as it passes just past the last pendant convection super heater 19. Heat extraction through the walls of the furnace between the last pendant convection super heater 19 and the first horizontal convection super heater 21 is minimized to provide a relatively isothermal zone between the last pendant super heater 19 and the first horizontal super heater 21. The temperature of the flue gas 10 does not drop below the minimum calcination temperature until it passes across the first horizontal super heater 21.

The last pendant super heater 19 and the first horizontal super heater 21 are spaced apart a distance to provide a residence time of the flue gas 10 flowing therebetween of approximately 300 to 500 milliseconds. An array of limestone injection nozzles 35 is positioned in vertical alignment along a side wall of the furnace just downstream of the last pendant super heater 19 for use in injecting limestone into the furnace transverse to the path of the flue gas 10. The limestone is injected into the furnace through the nozzles at a molar ratio of approximately 1.5 moles limestone to moles sulfur dioxide produced through the combustion of the fuel 5.

It is anticipated that almost 100% of the injected limestone will be calcined to lime and that the utilization of the calcium content of the limestone in the furnace will approach 0% in such a system.

It is to be understood that while certain forms of the present invention have been illustrated and described herein, it is not to be limited to the specific forms, arrangement of parts or combinations of ingredients described and shown.

What is claimed and desired to be secured by Letters Patent is as follows:

1. A process for removing sulfur dioxide from the flue gas of a furnace, the furnace being of a type in which the flue gas including sulfur dioxide is produced from the combustion of sulfur-containing fuels; said process comprising the step of:
   (a) injecting finely divided particles of limestone into said furnace directly into the flue gas at a location at which the temperature of said flue gas passing therethrough exceeds the minimum calcination temperature and is below the minimum effective quicklime utilization/sulfation temperature so as to convert a portion of said limestone to lime in said furnace while limiting quicklime sulfation of said lime in said furnace; and
   (b) conveying said flue gas with said lime entrained therein out of said furnace to a downstream flue gas desulfurization system wherein said lime is utilized in the removal of sulfur dioxide from said flue gas.

2. The process of claim 1 wherein the injecting step further comprises:
   (a) injecting limestone particles having a maximum particle size of approximately 100 microns in diameter into said furnace.

3. The process of claim 1 wherein the injecting step further comprises:
   (a) injecting limestone particles having a maximum particle size of approximately 10 microns in diameter into said furnace.

4. The process of claim 1 wherein after the injecting step and before said conveying step the process further comprises:
   (a) rapidly cooling said flue gas below a minimum hydrated lime sulfation temperature.

5. A process for removing sulfur dioxide from the flue gas of a furnace, the furnace being of a type in which the flue gas including sulfur dioxide is produced from the combustion of sulfur-containing fuels; said process comprising the steps of:
   (a) injecting finely divided particles of limestone into said furnace directly into the flue gas in close proximity to a location at which the temperature of the flue gas passing beyond said location remains above the minimum calcination temperature for a period sufficient for calcination of a portion of said limestone injected therein to lime, and the temperature of the flue gas passing beyond said location is below the minimum effective quicklime utilization/sulfation temperature or quickly drops below the minimum effective quicklime utilization/sulfation temperature so as to limit quicklime sulfation of said lime in said furnace;
   (b) conveying said flue gas with said lime entrained therein out of said furnace to a downstream flue gas desulfurization system wherein said lime is utilized in the removal of sulfur dioxide from said flue gas.

6. The process as in claim 5 including the steps of:
   (a) hydrating said lime in said downstream flue gas desulfurization system to produce hydrated lime;
   (b) allowing said hydrated lime to react with said sulfur dioxide in said flue gas to form calcium sulfite or calcium sulfate; and (c) separating said calcium sulfite and said calcium sulfate from said flue gas.

7. The process of claim 5 wherein after the injecting step and before said conveying step the process further comprises:

(a) rapidly cooling said flue gas below a minimum hydrated lime sulfation temperature.

8. A process for removing sulfur dioxide from the flue gas of a furnace, the furnace being of a type in which the flue gas including sulfur dioxide is produced from the combustion of sulfur-containing fuels; said process comprising the steps of:

(a) injecting finely divided particles of limestone into said furnace directly into the flue gas in close proximity to a location at which the temperature of the flue gas passing therethrough equals the minimum effective quicklime utilization/sulfation temperature such that the temperature of the flue gas in which said limestone is injected remains above the minimum calcination temperature for a period sufficient for calcination of a portion of said limestone injected therein to lime and such that the temperature of the flue gas in which said limestone is injected is below or quickly drops below the minimum effective quicklime utilization/sulfation temperature so as to limit quicklime sulfation of said lime in said furnace; and (b) conveying said flue gas with said lime entrained therein out of said furnace to a downstream flue gas desulfurization system wherein said lime is utilized in the removal of sulfur dioxide from said flue gas.

9. The process of claim 8 wherein after the injecting step and before said conveying step the process further comprises:

(a) rapidly cooling said flue gas below a minimum hydrated lime sulfation temperature.

10. A process for removing sulfur dioxide from the flue gas of a furnace, the furnace being of a type in which flue gas including sulfur dioxide is produced from the combustion of sulfur-containing fuels; said process comprising the steps of:

a) identifying a first set of operating conditions of said furnace including the concentration of sulfur dioxide, carbon dioxide and water vapor in the flue gas;

b) identifying a first minimum calcination temperature and a first minimum effective quicklime utilization/sulfation temperature for available limestone under said first set of operating conditions of said furnace;

c) identifying a first location within said furnace wherein the temperature of said flue gas passing therethrough approximately equals said first minimum effective quicklime utilization/sulfation temperature;

d) identifying a second location within said furnace wherein the temperature of said flue gas passing therethrough is approximately equal to said first minimum calcination temperature; and e) providing at least one first nozzle through which finely divided particles of said available limestone may be injected into said furnace;

f) positioning said first nozzle in close proximity to said first location such that when said furnace is operated under said first set of conditions injection of limestone through said first nozzle results in the calcination of a substantial portion of said limestone to lime while limiting quicklime sulfation of said lime in said furnace; and g) conveying said flue gas with said lime entrained therein out of said furnace to a downstream flue gas desulfurization system wherein said lime is utilized in the removal of sulfur dioxide from said flue gas.

11. The process as in claim 10 wherein the step of positioning said first nozzle further comprises:

(a) positioning said first nozzle such that limestone injected therethrough does not impinge upon any heat exchangers extending into said furnace.

12. The process as in claim 10 wherein the step of positioning said first nozzle further comprises:

(a) positioning said first nozzle such that after said flue gas passes said second location, said flue gas is rapidly cooled to a temperature below a minimum hydrated lime sulfation temperature.

13. The process of claim 10 wherein the step of positioning said first nozzle further comprises:

(a) positioning said first nozzle such that the temperature of said flue gas is maintained above the minimum calcination temperature for at least approximately 100 milliseconds after said limestone particles are injected through said first nozzle.

14. The process of claim 10 wherein the step of positioning said first nozzle further comprises:

(a) positioning said first nozzle such that the temperature of said flue gas is maintained above the minimum calcination temperature for approximately 100 to 600 milliseconds after said limestone particles are injected through said first nozzle.

15. The process of claim 10 further including the steps of:

a) identifying a second set of operating conditions of said furnace including the concentration of sulfur dioxide, carbon dioxide and water vapor in the flue gas;

b) identifying a second minimum calcination temperature and a second minimum effective quicklime utilization/ sulfation temperature for available limestone under said second set of operating conditions of said furnace;

c) identifying a third location within said furnace wherein the temperature of said flue gas passing therethrough approximately equals said second minimum effective quicklime utilization/sulfation temperature;

d) identifying a fourth location within said furnace wherein the temperature of said flue gas passing therethrough is approximately equal to said second minimum calcination temperature;

e) providing at least one second nozzle through which finely divided particles of said available limestone may be injected into said furnace;

f) positioning said second nozzle in close proximity to said third location such that when said furnace is operated under said second set of conditions, injection of limestone through said second nozzle results in the calcination of a substantial portion of said limestone to lime while limiting quicklime sulfation of said lime in said furnace; and g) providing means for selectively injecting said limestone through said first nozzle when said furnace operating conditions approach said first set of conditions and through said second nozzle when said furnace operating conditions approach said second set of conditions.

* * * * *